US011540445B2

(12) United States Patent
McKinnis, Jr. et al.

(10) Patent No.: US 11,540,445 B2
(45) Date of Patent: Jan. 3, 2023

(54) CROP MERGER SYSTEM FOR HARVESTER AND METHODS OF USING THE SAME

(71) Applicant: CNH Industrial America, LLC, New Holland, PA (US)

(72) Inventors: Jon M. McKinnis, Jr., Oxford, PA (US); Gregory Fasick, Hatfield, PA (US); Madhu Pankaj, West Chester, PA (US); Robert Fackler, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 191 days.

(21) Appl. No.: 15/964,853

(22) Filed: Apr. 27, 2018

(65) Prior Publication Data

US 2019/0327897 A1   Oct. 31, 2019

(51) Int. Cl.
*A01D 57/20* (2006.01)
*A01D 41/127* (2006.01)
*A01D 41/12* (2006.01)

(52) U.S. Cl.
CPC .......... *A01D 57/20* (2013.01); *A01D 41/127* (2013.01); *A01D 41/1243* (2013.01)

(58) Field of Classification Search
CPC .. A01D 41/1243; A01D 41/127; A01D 57/20; A01C 3/06; A01C 15/122; A01C 23/008; A24B 3/08
USPC ................ 56/10.2 G, 10.2 R; 131/108, 909; 177/70; 198/735.3; 239/672; 460/1, 460/112, 6
See application file for complete search history.

(56) References Cited

U.S. PATENT DOCUMENTS

| | | | | |
|---|---|---|---|---|
| 3,590,826 A | * | 7/1971 | Wochnowski | A24B 3/08 131/108 |
| 3,928,955 A | * | 12/1975 | Case | A01D 57/28 56/1 |
| 4,022,005 A | * | 5/1977 | Case | A01D 57/28 56/372 |
| 4,182,098 A | * | 1/1980 | Kass | A01D 34/83 56/14.5 |

(Continued)

FOREIGN PATENT DOCUMENTS

| | | | | |
|---|---|---|---|---|
| CA | 2815427 A1 | * | 10/2013 | ........... A01B 63/002 |
| EP | 914764 A1 | | 5/1999 | |

*Primary Examiner* — Thomas B Will
*Assistant Examiner* — Joan D Misa
(74) *Attorney, Agent, or Firm* — Peter Zacharias; Patrick Sheldrake

(57) ABSTRACT

The disclosure relates to a crop merger system for a harvester. The system includes a frame, first and second rollers mounted to the frame, and a belt disposed over the first and second rollers. The system includes a motor operably coupled to and configured to rotate the second roller. The system includes a controller configured to electronically receive as input a desired speed of the belt. The system includes a sensor configured to detect a measured characteristic associated with the crop merger system, and electronically transmit the measured characteristic to the controller. The controller is configured to determine a measured speed of the belt based on the measured characteristic, and if the desired speed and the measured speed are unequal, the controller is configured to regulate the motor to adjust a speed of the belt to be substantially equal to the desired speed.

5 Claims, 6 Drawing Sheets

(56) References Cited

U.S. PATENT DOCUMENTS

| | | | |
|---|---|---|---|
| 4,332,127 A | 6/1982 | Staiert et al. | |
| 4,522,018 A * | 6/1985 | Blakeslee | A01D 57/20 56/11.2 |
| 4,910,951 A * | 3/1990 | Reilly | A01D 57/20 56/370 |
| 4,967,544 A | 11/1990 | Ziegler et al. | |
| 5,203,154 A * | 4/1993 | Lesher | A01D 57/12 56/366 |
| 6,205,757 B1 * | 3/2001 | Dow | A01D 57/20 56/366 |
| 6,415,590 B1 * | 7/2002 | Lohrentz | A01D 57/20 56/14.9 |
| 6,971,225 B1 * | 12/2005 | Kempf | A01D 57/20 56/398 |
| 7,028,459 B2 * | 4/2006 | Lohrentz | A01D 57/20 56/192 |
| 7,066,810 B2 * | 6/2006 | Farley | A01D 41/1243 460/112 |
| 7,392,124 B2 | 6/2008 | MacGregor et al. | |
| 7,395,913 B1 * | 7/2008 | Canapa | B65G 67/08 198/312 |
| 7,484,349 B2 * | 2/2009 | Talbot | A01D 43/077 56/192 |
| 7,526,908 B1 * | 5/2009 | Rice | A01D 57/00 56/192 |
| 7,624,561 B2 * | 12/2009 | McLean | A01D 84/00 56/192 |
| 8,020,648 B2 | 9/2011 | Otto | |
| 8,347,709 B2 * | 1/2013 | Kormann | G01F 13/003 73/272 R |
| 9,089,092 B2 | 7/2015 | Diekhans et al. | |
| 9,101,090 B2 | 8/2015 | Pierce et al. | |
| 9,137,945 B2 | 9/2015 | Farley et al. | |
| 9,736,983 B2 * | 8/2017 | Treffer | A01D 43/04 |
| 2016/0021820 A1 | 1/2016 | Kraus | |

* cited by examiner

CROP MERGER SYSTEM FOR HARVESTER AND METHODS OF USING THE SAME

BACKGROUND

Harvesters such as windrowers, tractors, forage harvesters, and mowers (e.g., self-propelled) generally include a header operable to cut crop. Typical construction for such harvesters include a cab mounted to a frame, front ground wheels mounted on the frame, rear ground wheels mounted on a respective caster, and a header mounted to the frame. Some headers cut crop and feed the crop through the header such that the crop is output underneath the harvester, forming a windrow at a position substantially aligned with the center of the front ground wheels. Some harvesters include a crop merger that receives the crop from the header and outputs the crop to one side of the harvester, forming a windrow at a position substantially parallel to the direction of travel of the harvester.

The amount of crop output to the windrow generally depends on the amount of crop on the field and the speed of the harvester. Due to changes in crop loads while harvesting, the harvester engine speed can vary while traveling through the field. Changes in the crop loads can also vary the speed of the output belt of the crop merger. Such changes can result in irregular crop output to the windrow. Irregular crop output, in turn, can result in uneven drying of the crop, resulting in uneven densities of the collected crop, longer drying times, or loss of crop. In addition to other tasks, constant manual monitoring of the crop merger belt speed and the resulting windrow by the harvester operator is necessitated to ensure crop is thrown consistently the same distance onto the windrow with formation as desired.

SUMMARY

The disclosure relates to a crop merger system including one or more sensors that directly or indirectly measure the rotational speed of the crop merger belt. A controller is configured to analyze the measured rotational speed of the belt relative to an input desired speed of the belt, and adjusts the rotational speed of the belt to be substantially equal to the input desired speed of the belt. Therefore, even when crop conditions or loads vary, the crop merger system maintains a substantially constant belt speed to ensure a uniform windrow.

In accordance with some embodiments of the present disclosure, an exemplary crop merger system for a harvester is provided. The crop merger system includes a frame, a first roller rotatably mounted to the frame, a second roller rotatably mounted to the frame, and a belt disposed over and extending between the first and second rollers. The crop merger system includes a motor mounted to the frame and operably coupled to the second roller, the motor configured to rotate the second roller. The crop merger system includes a controller configured to electronically receive as input a desired speed of the belt. In some embodiments, the desired speed is a range of desired speeds.

The crop merger system includes a sensor configured to detect a measured characteristic associated with the crop merger system, and further configured to electronically transmit the measured characteristic to the controller. The controller is configured to determine a measured speed of the belt based on the measured characteristic. If the desired speed and the measured speed are unequal, the controller is configured to regulate the motor to adjust a speed of the belt to be substantially equal to the desired speed.

The frame includes a proximal end and a distal end. The first roller is rotatably mounted at or near the distal end of the frame, and the second roller is rotatably mounted at or near the proximal end of the frame. In some embodiments, the sensor includes at least one of an optical sensor, a non-contact sensor, a rotary sensor, combinations thereof, or the like. The motor includes a shaft operably coupled to the second roller, such that rotation of the shaft substantially simultaneously rotates the second roller. In some embodiments, a chain and sprockets can be used to indirectly drive the second roller with the motor.

In some embodiments, the measured characteristic includes a rotational speed of the shaft of the motor, and the controller is configured to determine the measured speed of the belt based on the rotational speed of the shaft of the motor. In some embodiments, the measured characteristic includes a rotational speed of the second roller, and the controller is configured to determine the measured speed of the belt based on the rotational speed of the second roller. In some embodiments, the measured characteristic includes a rotational speed of the belt, and the controller is configured to correlate the rotational speed of the belt with the measured speed of the belt.

The crop merger system includes a guide coupled to one side surface of the frame. The crop merger system includes a mounting assembly mounted to the frame. The mounting assembly is configured to operably couple the crop merger system to the harvester. The mounting assembly includes a central frame member, and first and second linkages pivotably mounted to the central frame member. The mounting assembly includes a hydraulic cylinder pivotably coupled at one end to the central frame member and pivotably coupled at an opposing end to the first linkage. The second linkages are pivotably coupled at one end to the central frame member and pivotably coupled at an opposing end to the first linkage. The mounting assembly includes connecting rods pivotably coupled at one end to the first linkage and at an opposing end to the frame.

In accordance with embodiments of the present disclosure, an exemplary harvester is provided. The harvester includes a harvester frame, a header removably coupled to the harvester frame, and a crop merger system mounted to the harvester frame. The crop merger system includes a crop merger frame, a first roller rotatably mounted to the crop merger frame, a second roller rotatably mounted to the crop merger frame, and a belt disposed over and extending between the first and second rollers. The crop merger system includes a motor mounted to the crop merger frame and operably coupled to the second roller, the motor configured to rotate the second roller.

The crop merger system includes a controller configured to electronically receive as input a desired speed of the belt. The crop merger system includes a sensor configured to detect a measured characteristic associated with the crop merger system, and further configured to electronically transmit the measured characteristic to the controller. The controller is configured to determine a measured speed of the belt based on the measured characteristic. If the desired speed and the measured speed are unequal, the controller is configured to regulate the motor to adjust a speed of the belt to be substantially equal to the desired speed. In some embodiments, the motor and belt can rotate in either the clockwise or counterclockwise direction, and the speed can be adjusted to the desired speed in either direction. In such embodiments, the adjusted speed can be different depending on the direction of rotation.

In some embodiments, the header is removably coupled to a front section of the harvester frame, and the crop merger system is coupled to a bottom section of the harvester frame. The crop merger system includes a mounting assembly coupled at one end to the crop merger frame and coupled at an opposing end to the harvester frame. The harvester includes a cab with a user interface, the user interface configured to receive as input from an operator the desired speed of the belt. The user interface is communicatively connected to the controller.

In accordance with embodiments of the present disclosure, an exemplary crop merger system for a harvester is provided. The crop merger system includes a frame comprising a proximal end and a distal end, a first roller rotatably mounted to the frame at or near the distal end, a second roller rotatably mounted to the frame at or near the proximal end, and a belt disposed over and extending between the first and second rollers. The crop merger system includes a motor mounted to the frame and operably coupled to the second roller, the motor configured to rotate the second roller.

The crop merger system includes a controller configured to electronically receive as input a desired speed of the belt. The crop merger system includes a sensor configured to detect a measured speed of the belt, and further configured to electronically transmit the measured speed of the belt to the controller. If the desired speed and the measured speed are unequal, the controller is configured to regulate the motor to adjust a speed of the belt to be substantially equal to the desired speed.

In accordance with embodiments of the present disclosure, an exemplary method of operating a crop merger system for a harvester is provided. The method includes inputting at a user interface of the harvester a desired speed of a belt for the crop merger system. The crop merger system includes a frame, a first roller rotatably mounted to the frame, a second roller rotatably mounted to the frame, the belt disposed over and extending between the first and second rollers, a motor mounted to the frame and operably coupled to the second roller, a controller, and a sensor. The method includes receiving as input at the controller the desired speed of the belt.

The method includes regulating rotation of the second roller with the motor to rotate the belt at the desired speed. The method includes detecting with the sensor a measured characteristic associated with the crop merger system. The method includes electronically transmitting the measured characteristic from the sensor to the controller. The method includes determining a measured speed of the belt with the controller based on the measured characteristic. If the desired speed and the measured speed are unequal, the method includes regulating the motor with the controller to adjust a speed of the belt to be substantially equal to the desired speed.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed crop merger system, reference is made to the accompanying figures, wherein.

DETAILED DESCRIPTION

Figure 1:
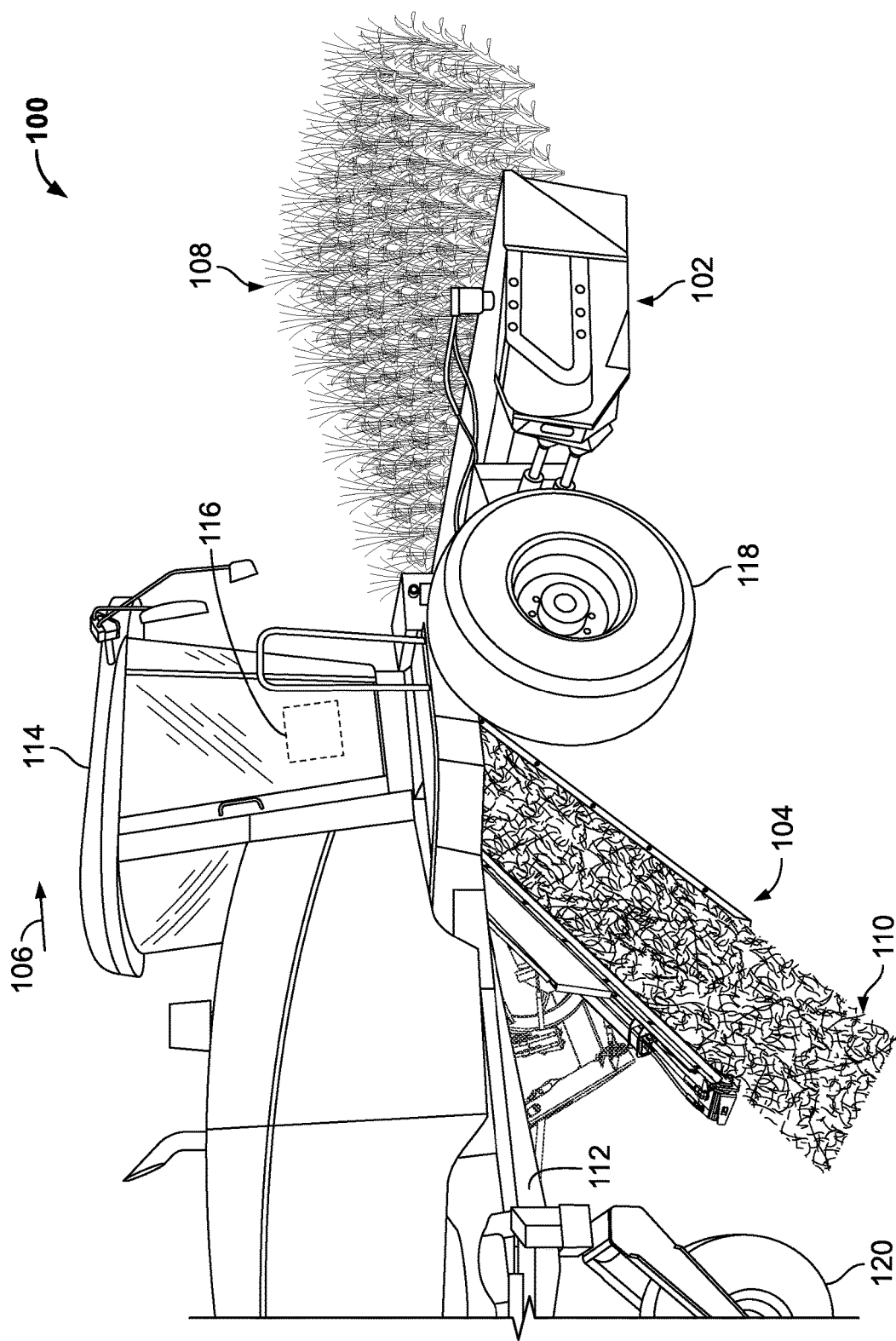
FIG. 1 is a side view of an exemplary harvester of the present disclosure including a crop merger system.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "substantially equal" as used herein when referring to a measurable and adjustable value, such as a rotational speed of a component, is meant to encompass a value equal to or approximately equal to a set value or range. For example, a speed of a crop merger belt can be adjusted to be equal to or within ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% of the set desired belt speed.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "drive system" as used herein is defined as an assembly, hydraulic, electronic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which comprises but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may comprise any apparatus that can contain, store, communicate, propagate, or transport the program for use by or in connection with the instruction execution system, or harvester. In some embodiments, the harvester comprises a software system with executable code that executes different hydraulic states based on operator settings. In some embodiments, the disclosure also relates to a computer software product with executable code that automatically toggles between or through different hydraulic states based on operator settings of the harvester. The software program product may be on any medium or a component of a system optionally configured for update or install into the software of an existing harvester.

In some embodiments, the medium may be or may comprise an electronic, magnetic, optical, electromagnetic, InfraRed (IR), or semiconductor system (or apparatus or device) or a propagation medium. Some demonstrative examples of a computer-readable medium may comprise a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks comprise Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may comprise at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about the speed of the crop merger belt.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the settings of the harvester (e.g., settings associated with the crop merger belt).

The term "real-time" and the phrase "in real-time" as used herein are defined as a way of describing a process, event, or action that occurs simultaneously with the process of actively operating a harvester. In some embodiments, various sensors continuously sense information about the harvester and transmit that information to a controller in real-time. In some embodiments, an operator may adjust values or thresholds for one or more hydraulic or electronic controllers in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. The present invention may also find utility in agricultural harvesters including, for example, a self-propelled windrower, a forage harvester, and a lawn mower.

In some embodiments, the method is performed by a harvester comprising a header, a crop merger system, and one or more sensors. In some embodiments, the one or more sensors are capable of determining a range of information. In some embodiments, the one or more sensors are in electronic communication with one or more controllers associated with the crop merger system. In some embodiments, the one or more sensors can be an optical sensor and/or a mechanical sensor configured to sense, e.g., the speed of the shaft associated with rotation of the crop merger belt, the speed of the crop merger belt itself, the speed of the roller associated with rotation of the crop merger belt, combinations thereof, or the like.

Based on the sensed and measured characteristic associated with one or more components of the harvester, the crop merger system is configured to determine or extrapolate the estimated or measured speed of the crop merger belt. The crop merger system compares the estimated or measured speed (or range of speeds) of the crop merger belt with the desired speed of the belt set by the operator. If the measured and desired speeds are determined to be unequal (or substantially unequal), the controller of the system can regulate the motor to adjust the speed of the crop merger belt to be substantially equal to the desired speed. By readjusting the speed of the crop merger belt in real-time or at predetermined intervals, the speed of the belt can be maintained at the desired level even during changes in crop load or other factors that generally affect traditional harvesters.

If the crop merger system includes two or more belts, the process can be performed for each belt simultaneously or in a synchronized or substantially synchronized manner. In some embodiments, the harvester can include a system that monitors and regulates/adjusts the speed of both the header and crop merger system belts based on the input belt speeds by the operator in a synchronized or substantially synchronized manner.

FIG. 1 shows a side view of an exemplary harvester 100 including a header 102 at the front of the harvester 100 and a crop merger system 104 disposed below the harvester 100. It should be understood that the crop merger system 104 discussed herein can be attached and/or interchanged with any type of harvester 100. As the harvester 100 moves in a forward direction of travel 106, the header 102 is configured to cut and intake crop 108. The cut crop 108 passes through the header 102 and onto the crop merger system 104, which outputs the crop 110 on the side of the harvester 100 in the form of a windrow. The windrow of the output crop 110 extends substantially parallel to the direction of travel 106 of the harvester 100.

As will be discussed in greater detail below, the harvester 100 includes a closed loop speed control of the output belt associated with the crop merger system 104 to control, adjust and maintain a substantially constant belt speed. Specifically, even if the load from the crop 108 changes as the harvester 100 travels along the field, the crop merger system 104 is capable of maintaining a substantially constant belt speed, resulting in a substantially consistent and/or uniform windrow formation.

A speed sensor (e.g., an optical sensor, a non-contact sensor, a mechanical sensor, a rotary sensor, or the like) is added to the control circuit associated with the crop merger system 104 to detect the hydraulic and/or electric motor output speed driving the crop merger belt. In some embodiments, the speed sensor can be used to detect, e.g., the speed of the shaft associated with rotation of the crop merger belt, the speed of the crop merger belt itself, the speed of the roller associated with rotation of the crop merger belt, combinations thereof, or the like. In some embodiments, the speed sensor can be integral to the motor and/or external to the motor, and measures the motor shaft speed. From the motor shaft speed, the linear belt speed of the crop merger system 104 can be determined. In some embodiments, a combination of multiple speed sensors can be used and the signals from each sensor can be compared prior to transmission of adjustments to the controller to ensure the accuracy of the adjustments.

In some embodiments, a hydraulic motor, an electric motor, or both, can be used to power the crop merger system 104. The motor can be mounted directly or indirectly to the drive roller of the merger belt. A pump of the crop merger system 104 can be a fixed or variable displacement pump, with flow being proportional to the engine speed of the harvester 100. The belt speed is thereby controlled by a proportional cartridge valve varying the flow to the drive motor based on the desired belt speed set by the operator via a graphical user interface (GUI). By using the speed sensor, a closed loop control of the crop merger belt is implemented to constantly or substantially constantly monitor the crop merger belt speed in real-time. In some embodiments, rather than a constant monitoring, the speed sensors can periodically measure the crop merger belt speed such that adjustments are performed periodically (e.g., once every 30 seconds, once every minute, once every five minutes, or the like). A feedback loop sending signals to the controller regarding the detected crop merger belt speed can be used to automatically adjust the proportional valve to maintain the crop merger belt speed set by the operator regardless of changes in crop loads. In some embodiments, the motor and belt can rotate in either the clockwise or counterclockwise direction. In such embodiments, the speed can be adjusted to the desired speed in either direction. In some embodiments, the desired speeds can be different depending on the direction of rotation.

The crop merger system 104 removes the necessity for physical calibration when installing and setting up a crop merger to ensure that the merger belt set speed by the operator matches the actual measured belt speed. Because the crop merger system 104 detects the actual measured speed associated with the belt (whether the belt itself, the motor shaft, or the roller), the necessity of calibrating the control current to the proportional valve such that the valve provides the correct amount of flow to the motor to achieve the desired belt set speed is also removed. Instead, the closed loop control of the crop merger system 104 ensures that the belt speed is maintained at the speed set by the operator throughout operation of the harvester 100, and adjusts for changes in crop loads, hydraulic fluid flow, or the like.

Still with reference to FIG. 1, the harvester 100 includes a frame 112, and a cab 114 mounted to the frame 112 and including a graphical user interface (GUI) 116. The GUI 116 can be configured to receive input from the operator (e.g., the desired crop merger belt speed, a range of desired crop merger belt speeds, or the like) for operating the harvester 100 and the crop merger system 104. The GUI 116 can output to the operator information associated with the harvester 100 and the crop merger system 104 (e.g., the set crop merger belt speed). The harvester 100 includes a pair of front wheels 118 mounted to the frame 112, and a pair of rear caster wheels 120.

Figure 2:
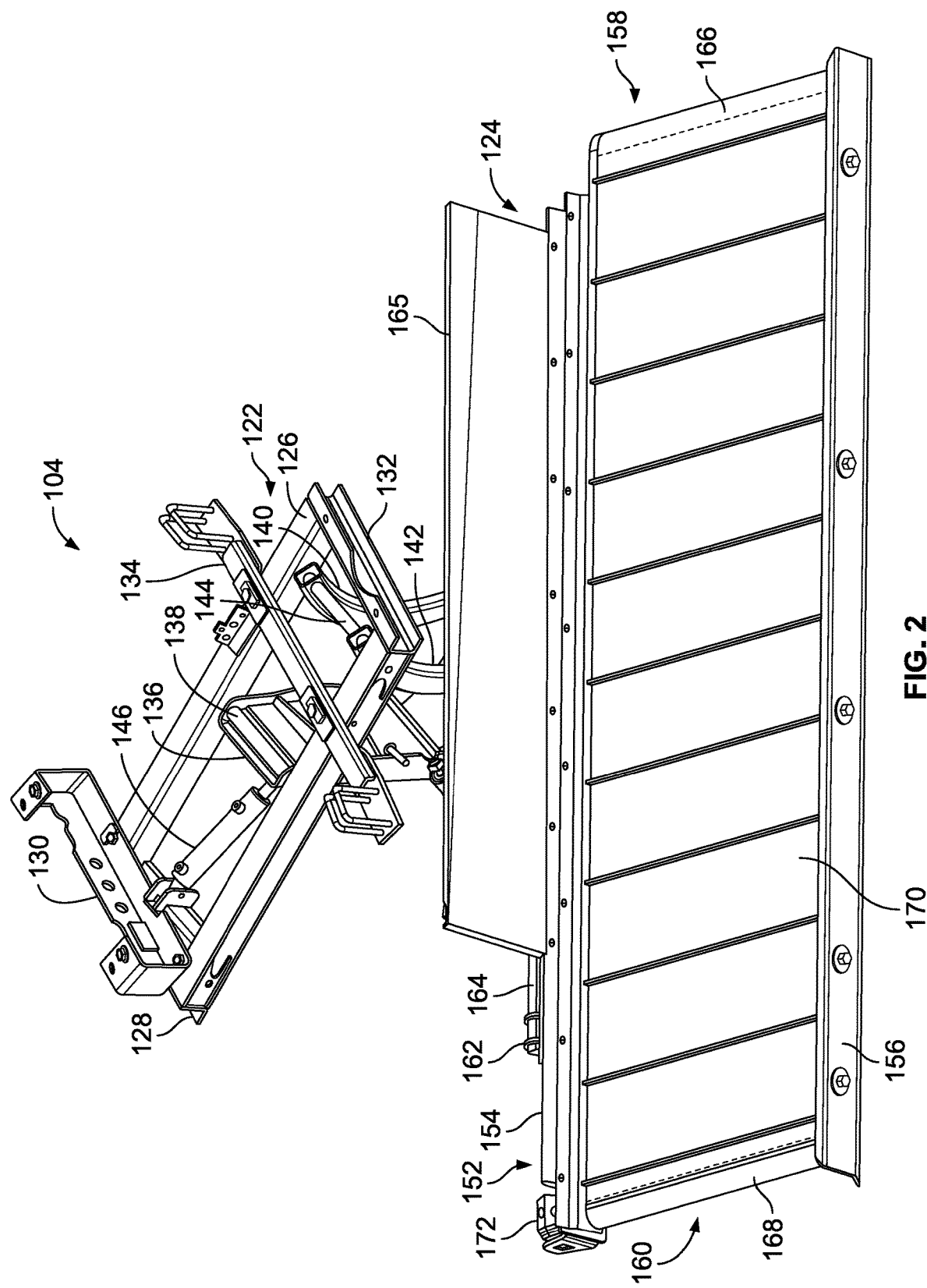
FIG. 2 is a front perspective view of an exemplary crop merger system of FIG. 1.
Figure 3:
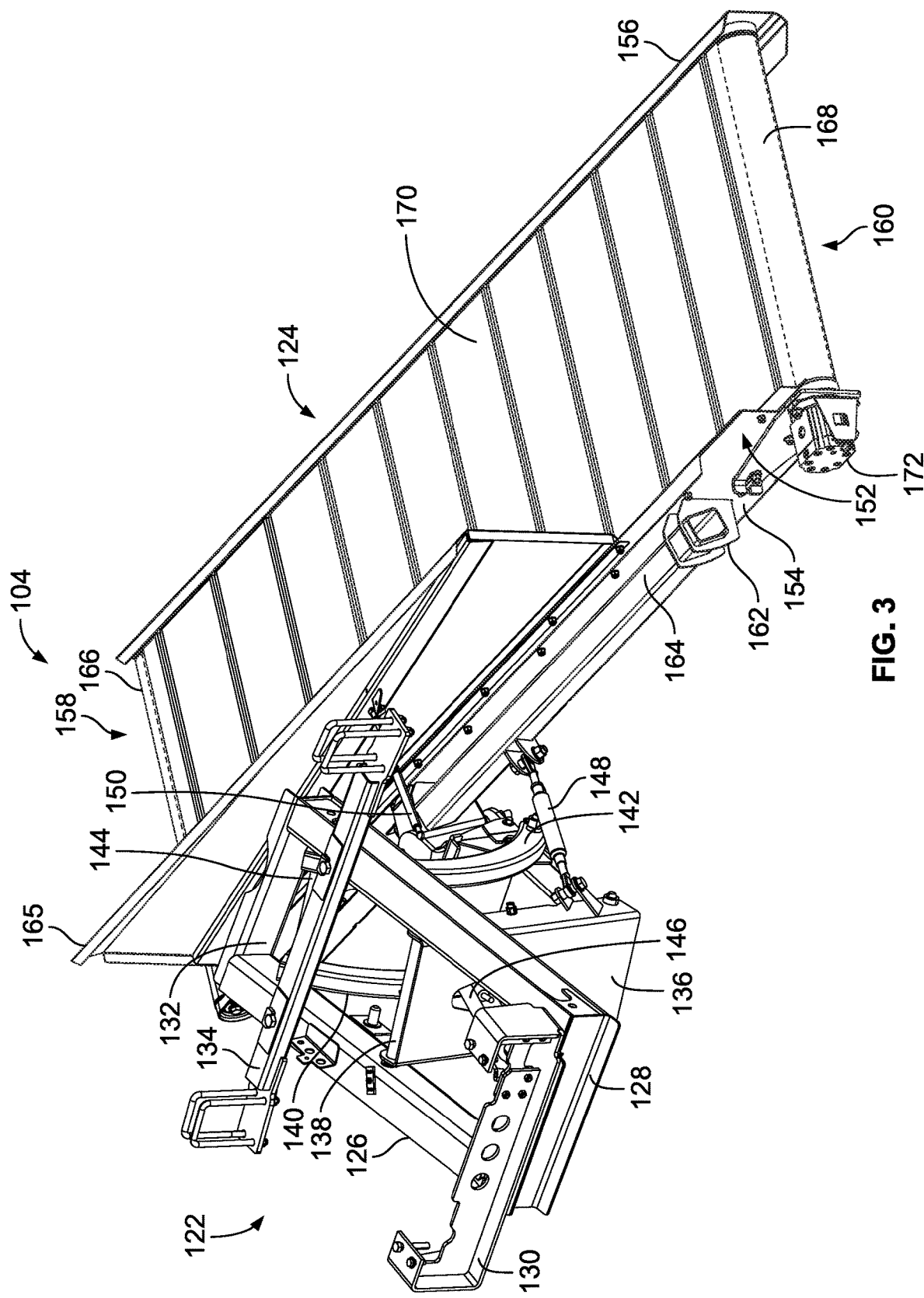
FIG. 3 is a rear perspective view of an exemplary crop merger system of FIG. 1.
Figure 4:
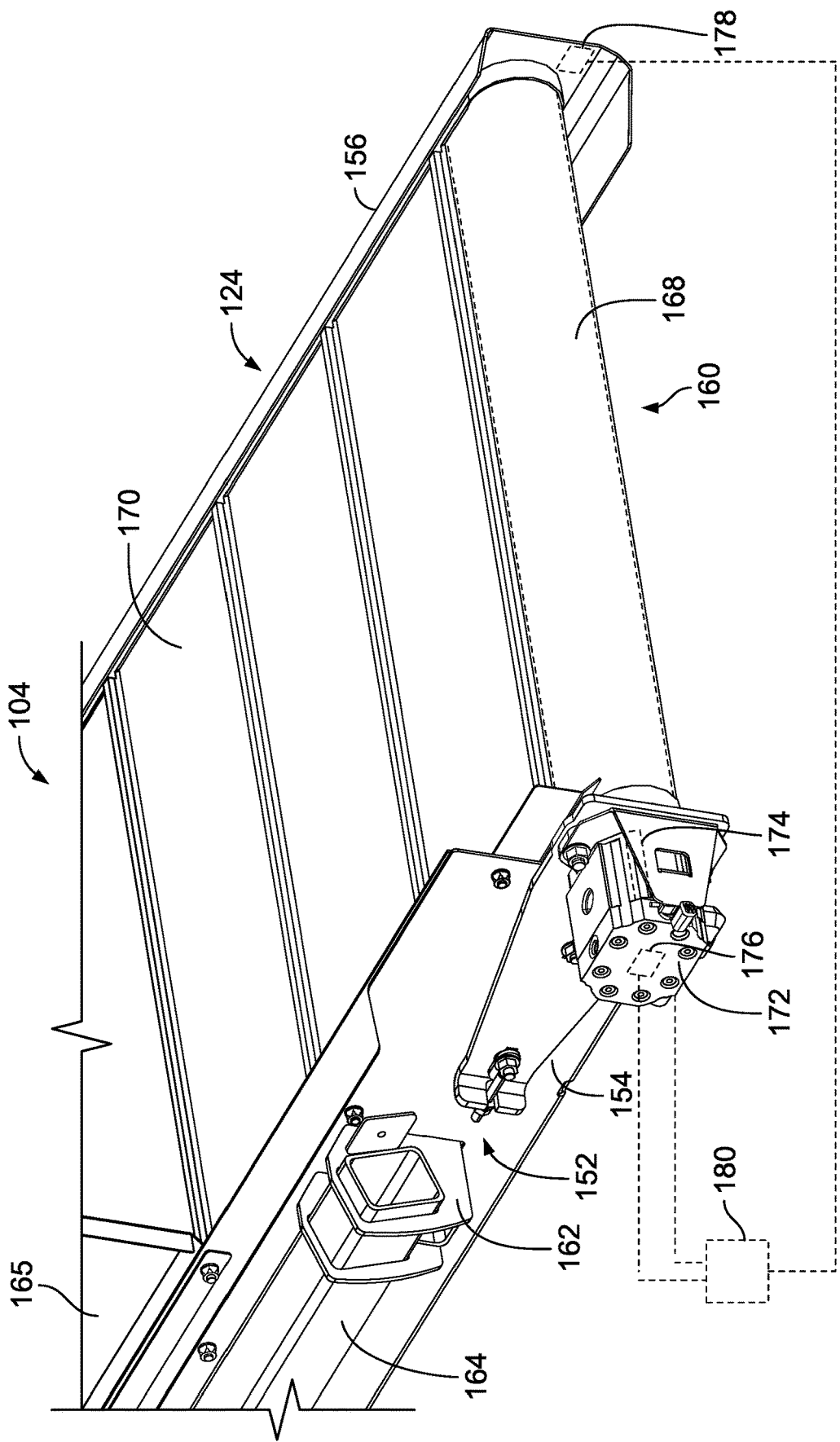
FIG. 4 is a detailed view of an exemplary crop merger system of FIG. 1.

FIGS. 2-4 show front, rear and detailed views of the crop merger system 104. The crop merger system 104 generally includes a mounting assembly 122 operably coupled to a belt assembly 124. The mounting assembly 122 is configured and dimensioned to be mounted to the bottom of the frame 112 of the harvester 100 by means of adapter assemblies 130, 134 (e.g., flanges, cross members, or the like). The mounting assembly 122 generally includes a central frame member 126 defining, e.g., a parallelogram, square or rectangular configuration. The frame member 126 can be formed from one or more structural elements coupled together. The mounting assembly 122 includes a substantially linear mounting assembly 134 coupled to the top of the frame member 126 between the ends 128, 132. One end 128 of the frame member 126 can include a U-shaped adapter assembly 130 mounted to the frame member 126, such that the adapter assembly 130 and an opposing end 132 of the frame member 126 can be coupled to the bottom of the frame 112 of the harvester 110 via the mounting assembly 134. For example, adapter assemblies 130, 134 can be used to secure the central frame member 126 to the frame 112.

The ends 128, 132 can be uniquely shaped to allow clearance for other components of the harvester 100 (not shown for clarity), and to avoid interference with features of the frame 112. In some embodiments, the frame member 126 and/or linkages 142 can include a lockout mechanism to prevent unintended motion of the mounting assembly 122 relative to the belt assembly 124. The frame member 126 can include provisions for a hydraulic connection bulkhead, ensuring proper routing and alignment of the hydraulic hoses such that the hoses avoid interferences with other harvester 100 components.

A first linkage 136 can be pivotably coupled between side members of the frame member 126 by a shaft 138, and a second pair of linkages 140, 142 (e.g., second linkages) can be pivotably coupled between the side members of the frame member 126 by a shaft 144. In some embodiments, the linkage 136 can define a substantially L-shaped configuration. A hydraulic cylinder 146 can be coupled at one end to the inner surface of the end 128 of the frame member 126, and to the rear side of the vertical component of the linkage 136 at the opposing end, thereby providing for hydraulic control to vary the position of the linkage 136. A hydraulic cylinder 148 can be coupled at one end to a side surface of a horizontal component of the linkage 136 and to the belt assembly 124 at the opposing end. In some embodiments, a similar hydraulic cylinder 148 can be coupled to the opposing side surface of the horizontal component of the linkage 136 to provide for greater control of the position of the linkage 136.

The endpoints of the linkages 140, 142 can be pivotably coupled to the respective side surface of the horizontal component of the linkage 136. One or more connecting rods 150 can be used to operably and movably couple the end surface of the horizontal component of the linkage 136 to the belt assembly 124. The cylinders 146, 148, linkages 140, 142, and rods 150 in combination operate to control and stabilize the position of the linkage 136, thereby varying the position of the mounting assembly 122 to the belt assembly 124. For example, the frame member 126, the shaft 138, and the linkages 140, 142 can work together as a four-bar linkage to lift the belt assembly 124 out of the way for laying harvested crop under the center of the harvester 100, and lowering the belt assembly 124 into position such that the belt assembly 124 can redirect the harvester crop out of the right side of the harvester 100. By repositioning the linkage 136, the remaining members of the mounting assembly 122 are acted upon to deploy, disengage or reposition the belt assembly 124.

The belt assembly 124 includes a frame 152 including first and second opposing side surfaces 154, 156. A distal end 158 of the belt assembly 124 defines the area at which crop from the header 102 is introduced to the crop merger system 104, and a proximal end 160 of the belt assembly 124 defines the area at which crop is output to the windrow. Flanges 162 mounted to the side surface 154 include openings that receive and retain a support rod 164. The support rod 164 can be operably coupled to one or more components of the mounting assembly 122 (e.g., hydraulic cylinder 148, rods 150, or the like) such that the mounting assembly 122 can regulate the position and/or angle of the belt assembly 124.

The belt assembly 124 includes a first roller 168 pivotably mounted at or near the distal end 158 between the side surfaces 154, 156, and a second roller 166 pivotably mounted at or near the proximal end 160 between the side surfaces 154, 156. A continuous or multipart crop merger belt 170 is disposed over and looped between the rollers 166, 168. The belt assembly 124 includes one or more motors 172 (hydraulic and/or electronic motors) mounted to the frame 152. A shaft 174 of the motor 172 is operably coupled to the roller 168 such that rotation of the shaft 174 rotates the roller 168 which, in turn, rotates the belt 170. In some embodiments, the roller 166 can passively rotate as the belt 170 rotates due to friction between the belt 170 and roller 166. In some embodiments, a secondary motor substantially similar to motor 172 can be operably coupled to the roller 166. In such embodiments, the rotational speed of the shaft 174 of the motors 172 can be coordinated to ensure proper rotational speed of the belt 170. The belt assembly 124 includes a guide 165 mounted to the side surface 154 to assist in maintaining the crop on the belt 170 until output.

As shown in FIG. 4, the belt assembly 124 includes one or more sensors 176, 178 associated with the motor 172 and/or the roller 168. In some embodiments, the sensors 176, 178 can be, e.g., an optical sensor, a non-contact sensor, a mechanical sensor, a rotary sensor, or the like. The sensors 176, 178 can be configured to measure one or more characteristics associated with components of the system 100 that can be used to determine the rotational speed of the belt 170. In some embodiments, the sensors 176, 178 can monitor and detect the rotational speed of the shaft 174 of the motor 172 in substantially real-time, and electronically transmit signals corresponding with the detected rotational speed of the shaft 174 to a controller 180 (e.g., a processing device). In some embodiments, the sensors 176, 178 can monitor and detect the rotational speed of the roller 168 (and/or roller 166) in substantially real-time, and electronically transmit signals corresponding with the detected rotational speed of the roller 168 to the controller 180.

The controller 180 can determine the rotational speed of the belt 170 based on the rotational speed of the shaft 174 and/or the roller 168, and is electronically coupled to the GUI 116 at which the desired speed of the belt 170 has been input by the operator of the harvester 100. In some embodiments, the sensors 176, 178 can monitor and detect the rotational speed of the belt 170 in substantially real-time, and electronically transmit signals corresponding with the detected rotational speed of the belt 170 to the controller 180. The controller 180 can therefore determine the rotational speed of the belt 170 directly and/or indirectly from the sensor 176, 178 data. The controller 180 can continuously or periodically compare the detected belt 170 speed to the input belt speed at the GUI 116.

If the detected belt 170 speed is determined to be different from the input belt speed (e.g., due to increased crop loads), the controller 180 automatically adjusts the belt 170 speed to match the input belt speed. In some embodiments, the controller 180 can adjust the belt 170 speed if there is any difference between the desired and measured belt 170 speeds. In some embodiments, the controller 180 can adjust the belt 170 speed if the difference between the desired and measured belt 170 speeds is above a predetermined threshold. For example, if the belt 170 speed is measured to be about 5% less or about 5% greater than the set desired speed, the controller 180 can automatically adjust the belt 170 speed to match the input belt speed. In some embodiments, the controller 180 can average the speed difference and linearly or non-linearly adjusts the belt 170 speed to match the input belt speed. Thus, as crop loads change and impact the speed of the belt 170, the closed loop speed control system formed by the sensors 176, 178 and the controller 180 adjusts the belt 170 speed to be substantially equal to the desired belt speed input at the GUI 116. A substantially constant belt 170 speed can thereby be maintained without manual monitoring and adjustment by the operator, resulting in an even windrow. In some embodiments, the system 100 can generate a database of historical data corresponding with belt 170 speeds and adjustments performed by the controller 180. Thus, if one or more of the sensors 176, 178 fail and stop sending signals to the controller 180, the controller 180 can use the historical data in the database to regulate the speed of the belt 170 at close to the input speed until the harvester 100 operator has a chance to replace or fix the failed sensor 176, 178.

By monitoring the speed of the crop merger belt 170 (rather than components of the header 102), a more accurate adjustment of the belt 170 speed is performed to ensure the even windrow. For example, the speed of the belt associated with the header 102 generally does not correlate or is not proportional to the speed of the crop merger belt 170 and/or the amount of crop output by the crop merger belt 170. Instead, measurements of the header 102 belt speed are generally used to determine how much crop is input to the harvester 100, not how much crop is being output. Therefore, directly monitoring and adjusting the speed of the crop merger belt 170 ensures a more accurate operation for achieving an even windrow formed by the output crop.

Figure 5:
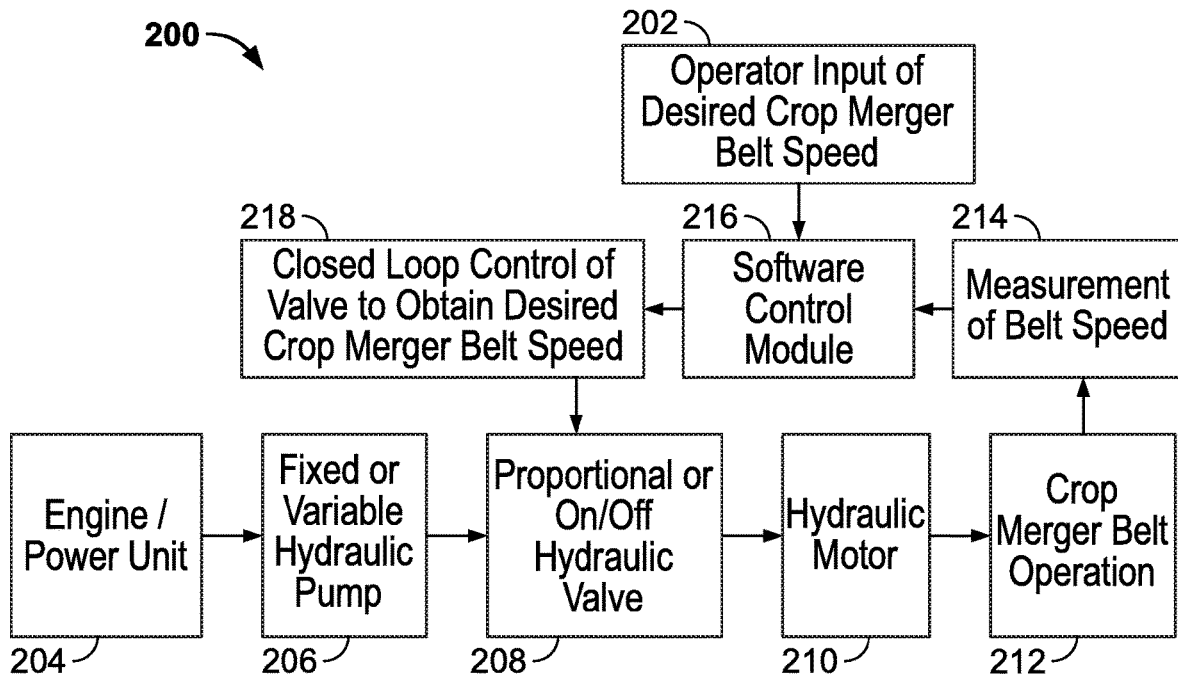
FIG. 5 is a flowchart of an exemplary method of operating a crop merger system including a hydraulic motor.

FIG. 5 is a flowchart of an exemplary method 200 of operating a crop merger system including a hydraulic motor. It should be understood that the steps discussed herein do not necessarily need to occur in the listed order, and instead monitoring and adjustment of the components can be performed by the system as needed for maintaining a substantially constant belt speed. At step 202, the operator can input the desired crop merger belt speed (or ranges of speeds allowed) at the GUI of the harvester.

At step 204, the engine (e.g., power unit) of the harvester is started. At step 206, a fixed or variable hydraulic pump of the harvester initiates flow to a hydraulic valve. In some embodiments, the pump can be a fixed displacement pump, resulting in a proportional relationship between the flow of hydraulic fluid and the engine speed. At steps 208, 210 a proportional or on/off hydraulic valve receives the hydraulic fluid from the pump and varies the flow to the hydraulic motor. At step 212, based on input of the hydraulic fluid to the hydraulic motor, the motor actuates rotation of the crop merger belt.

At step 214, one or more sensors are used to determine the crop merger belt speed. At step 216, the measured crop merger belt speed is electronically transmitted to a controller executing a software control module. At step 218, a closed loop control of components associated with the harvester is performed by the system to obtain and maintain the desired crop merger belt speed. Particularly, the closed loop control determines whether the measured crop merger belt speed matches the desired crop merger belt speed input at step 202. Based on this comparison, the controller regulates the hydraulic valve of step 208 to adjust or maintain the rotational speed of the shaft associated with the hydraulic motor. The crop merger belt speed is thereby automatically adjusted in real-time to be substantially equal to the desired crop merger belt speed, even during changes in crop load. In some embodiments, the controller can periodically measure and adjust the belt speed (rather than a constant closed loop control), for example, once every minute, or the like.

Figure 6:
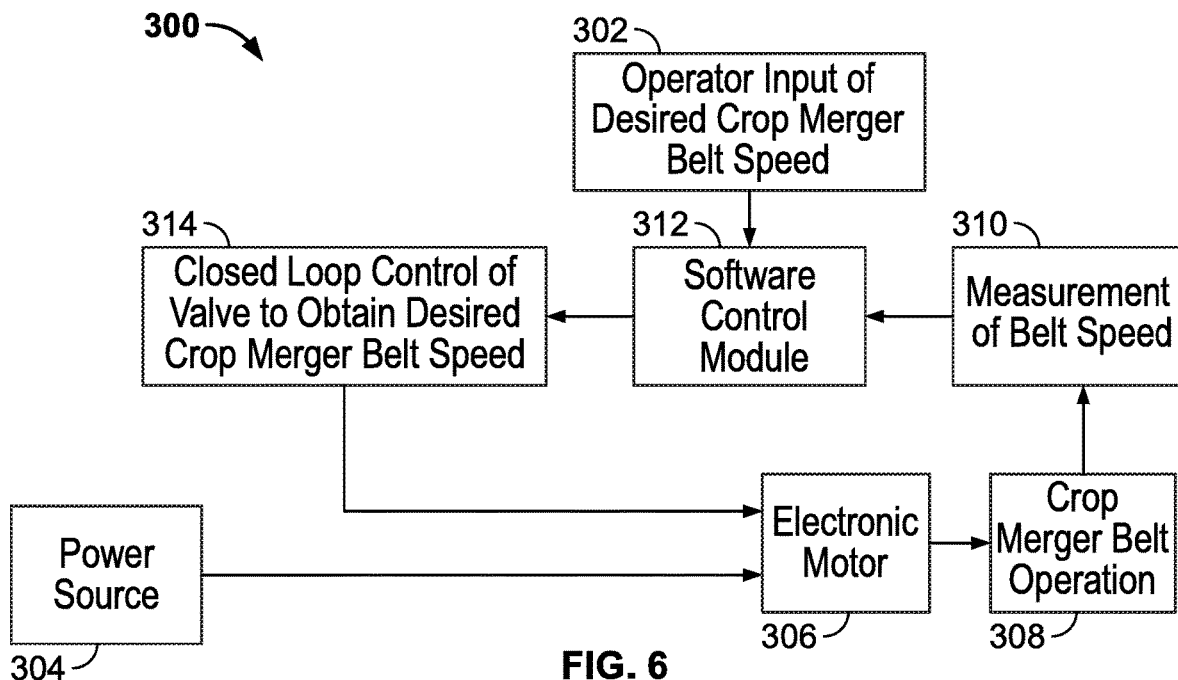
FIG. 6 is a flowchart of an exemplary method of operating a crop merger system including an electronic motor.

FIG. 6 is a flowchart of an exemplary method 300 of operating the crop merger system including an electric motor. It should be understood that the steps discussed herein do not necessarily need to occur in the listed order, and instead monitoring and adjustment of the components can be performed by the system as needed for maintaining a substantially constant belt speed. At step 302, the operator can input the desired crop merger belt speed or a range of desired crop merger belt speeds at the GUI of the harvester. At step 304, a power source is used to provide power to the electric motor to initiate rotate of a shaft associated with the electric motor. The amount of power provided to the electric motor varies the rotational speed of the shaft. At step 306, the electronic motor initiates rotation of the shaft.

At step 308, the crop merger belt begins to rotate based on coupling of the motor shaft with the roller of the belt. At step 310, one or more sensors are used to determine the crop merger belt speed. At step 312, the measured crop merger belt speed is electronically transmitted to a controller executing a software control module. At step 314, a closed loop control of components associated with the harvester is performed by the system to obtain and maintain the desired crop merger belt speed. Particularly, the closed loop control determines whether the measured crop merger belt speed matches the desired crop merger belt speed or falls within the range of desired crop merger belt speeds input at step 202. Based on this comparison, the controller regulates the power provided to the electronic motor of step 306 to adjust or maintain the rotational speed of the shaft associated with the electronic motor. The crop merger belt speed is thereby automatically adjusted in real-time to be substantially equal to the desired crop merger belt speed, even during changes in crop load.

Figure 7:
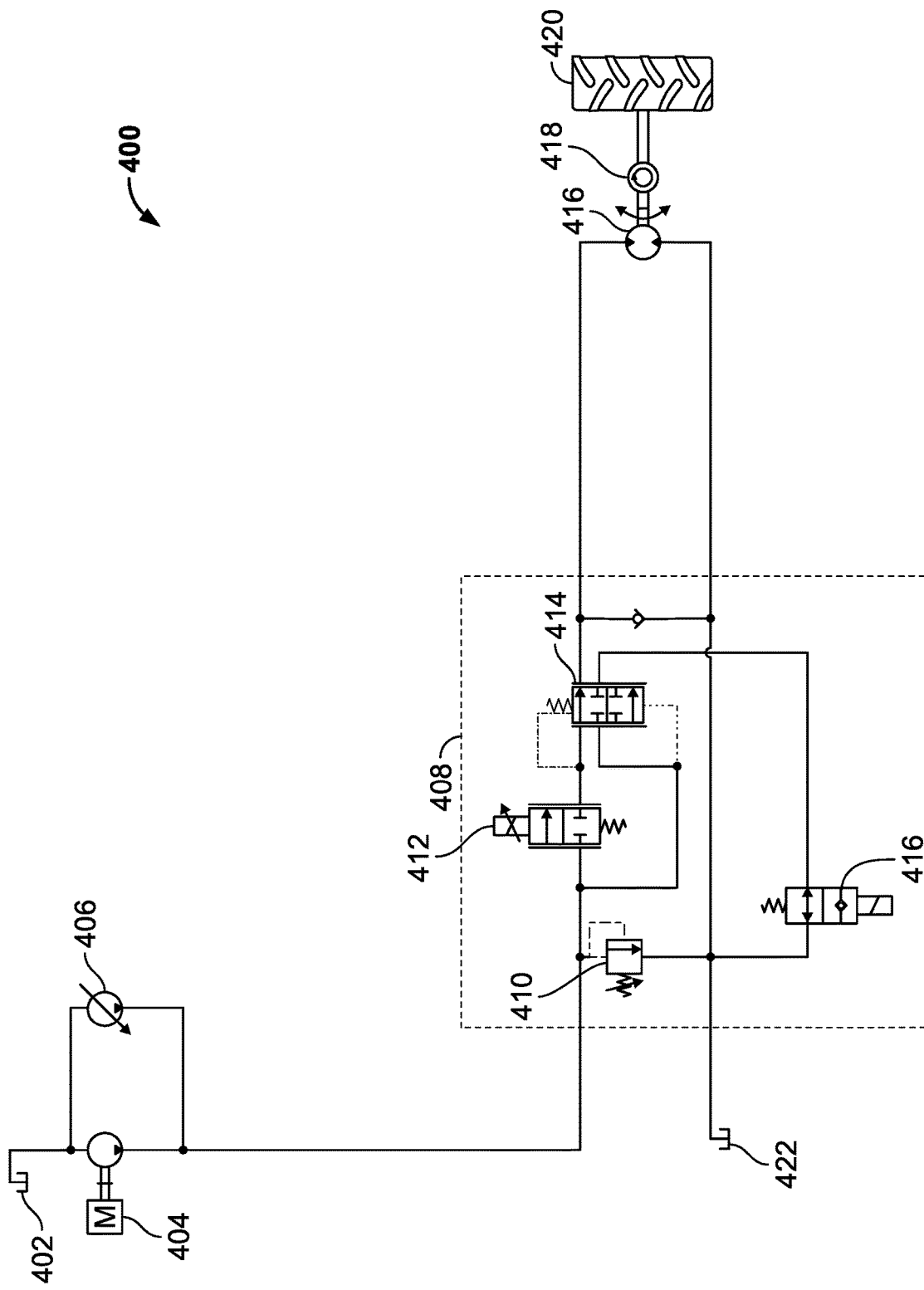
FIG. 7 is a diagrammatic view of a hydraulic system of an exemplary crop merger system of FIG. 1.

FIG. 7 is a diagrammatic view of an exemplary hydraulic system 400 for actuation of the crop merger system 100. The system 400 includes a reservoir 402 fluidically connected to fixed pump 404 and/or a variable pump 406. The pumps 404, 406 are fluidically connected to a section 408 that can include any type of hydraulic manifold, on/off valve, or proportional valve combination. The section 408 can include a relief valve 410 and control valves 412-416 (or any similar valves) fluidically connected to each other. The system 400 includes a motor 418 including a shaft 420 coupled to a roller associated with the crop merger belt 422, such that rotation of the shaft 420 rotates the crop merger belt 422. The motor 416 and valves 410-416 are further fluidically connected to a reservoir 422. In operation, the system 400 is actuated to regulate the speed of the crop merger belt 422 such that the speed is maintained substantially equal to the input desired belt speed. Particularly, the valves 412-416 can be actuated proportionally and/or on/off to rotate the motor 416. FIG. 7 shows the valve 412 proportionally controlled to regulate flow to the motor 416, thereby matching the desired belt set speed. In some embodiments, alternative valves and processes can be used to vary the speed of the motor 416.

While exemplary embodiments have been described herein, it is expressly noted that these embodiments should not be construed as limiting, but rather that additions and modifications to what is expressly described herein also are included within the scope of the present disclosure. More-over, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A harvester, comprising:
a harvester frame comprising a front section and a bottom section;
a header removably coupled to the harvester frame; and
a crop merger system mounted to the harvester frame, the crop merger system comprising:
a crop merger frame;
a first linkage and a second linkage pivotally mounted to the crop merger frame;
a first roller rotatably mounted to the crop merger frame;
a second roller rotatably mounted to the crop merger frame;
a belt disposed over and extending between the first and second rollers and fixed to form substantially planar upper and lower portions between the first and second rollers;
a motor mounted to the crop merger frame and operably coupled to the second roller, the motor configured to rotate the second roller;
a controller configured to electronically receive as input a desired speed of the belt; and
a sensor configured to detect a measured characteristic associated with the crop merger system, and further configured to electronically transmit the measured characteristic to the controller,
wherein the controller is configured to determine a measured speed of the belt based on the measured characteristic,
wherein if the desired speed and the measured speed are unequal, the controller is further configured to regulate the motor to adjust a speed of the belt to be substantially equal to the desired speed,
wherein the header is removably coupled to the front section of the harvester frame, and the crop merger system is coupled to the bottom section of the harvester frame; and
said system further comprises a first hydraulic cylinder pivotably coupled at one end to the crop merger frame member and pivotably coupled at an opposing end to the first linkage and a second hydraulic cylinder coupled to said first linkage and to the crop merger frame.

2. The harvester of claim 1, wherein the crop merger system further comprises a mounting assembly coupled at one end to the crop merger frame and coupled at an opposing end to the harvester frame.

3. The harvester of claim 1, further comprising a cab with a user interface, the user interface configured to receive as input from an operator the desired speed of the belt.

4. The harvester of claim 3, wherein the user interface is communicatively connected to the controller.

5. A crop merger system for a harvester, comprising:
a frame comprising a proximal end and a distal end;
a mounting assembly mounted to the frame, the mounting assembly configured to operably couple the crop merger system to a harvester, the mounting assembly comprising a central frame member, and a first linkage and a second linkage pivotably mounted to the central frame member;
a first roller rotatably mounted to the frame at or near the distal end;
a second roller rotatably mounted to the frame at or near the proximal end;
a belt disposed over and extending between the first and second rollers and fixed to form substantially planar upper and lower portions between the first and second rollers;
a motor mounted to the frame and operably coupled to the second roller, the motor configured to rotate the second roller;
a controller configured to electronically receive as input a desired speed of the belt; and
a sensor configured to detect a measured speed of the belt, and further configured to electronically transmit the measured speed of the belt to the controller,
wherein if the desired speed and the measured speed are unequal, the controller is configured to regulate the motor to adjust a speed of the belt to be substantially equal to the desired speed; and
said system further comprises a first hydraulic cylinder pivotably coupled at one end to the central frame member and pivotably coupled at an opposing end to the first linkage and a second hydraulic cylinder coupled to said first linkage and to the frame.

* * * * *